(12) United States Patent
Park et al.

(10) Patent No.: US 7,955,724 B2
(45) Date of Patent: Jun. 7, 2011

(54) SECONDARY BATTERY HAVING A FILM INCLUDING EXPANDABLE GRAPHITE AND POLYURETHANE

(75) Inventors: Hyunwoo Park, Daejeon (KR); Kwangho Yoo, Daejeon (KR); Bo Hyun Kim, Seoul (KR)

(73) Assignee: LG Chem, Ltd. (KR)

( * ) Notice: Subject to any disclaimer, the term of this patent is extended or adjusted under 35 U.S.C. 154(b) by 994 days.

(21) Appl. No.: 11/778,332

(22) Filed: Jul. 16, 2007

(65) Prior Publication Data
US 2008/0020270 A1     Jan. 24, 2008

(30) Foreign Application Priority Data
Jul. 18, 2006   (KR) .................. 10-2006-0066645

(51) Int. Cl.
*H01M 10/52* (2006.01)
*H01M 10/20* (2006.01)
(52) U.S. Cl. ......................................... 429/57; 429/120
(58) Field of Classification Search .................. None
See application file for complete search history.

(56) References Cited

U.S. PATENT DOCUMENTS
2005/0281999 A1 * 12/2005 Hofmann et al. .......... 428/304.4

FOREIGN PATENT DOCUMENTS
KR    10-2006-0034181     *   4/2006

OTHER PUBLICATIONS

English machine translation of KR10-2006-0034181 provide by KIPO.*

* cited by examiner

*Primary Examiner* — Dah-Wei D Yuan
*Assistant Examiner* — Maria J Laios
(74) *Attorney, Agent, or Firm* — Cantor Colburn LLP

(57) ABSTRACT

Disclosed herein is a secondary battery which comprises a film ("safety film") including expansible graphite that generates inflammable gas at a high temperature and polyurethane that causes an endothermic reaction and generates char at a high temperature. The safety film is a thin member, and therefore, the secondary battery according to the present invention has effects in that the safety film can be easily attached to a region of the secondary battery where the operating components of the secondary battery are not affected. In addition, the graphite component and the polyurethane component included in the safety film provide effective and perfect inflammability by virtue of the inflammable gas and char generated from the graphite component and the polyurethane component, respectively.

6 Claims, No Drawings

SECONDARY BATTERY HAVING A FILM INCLUDING EXPANDABLE GRAPHITE AND POLYURETHANE

FIELD OF THE INVENTION

The present invention relates to a secondary battery with an improved safety, and, more particularly, to a secondary battery comprising a film ("safety film") including expansible graphite that generates inflammable gas at a high temperature and polyurethane that causes an endothermic reaction and generates char at a high temperature, the safety film being disposed in the battery.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having high energy density and high discharge voltage, on which much research has been carried out and which is now commercialized and widely used.

One of the biggest problems caused from such a lithium secondary battery is a low safety. A possibility of the lithium secondary battery catching fire and exploding is strong in various situations, such as overcharge, external heat, and physical deformation. Consequently, there have been proposed various methods of preventing the overcharge, which is a cause of the combustion and explosion of the lithium secondary battery, and preventing the occurrence of an internal short circuit due to the physical deformation of the lithium secondary battery. However, a means for preventing the combustion and explosion of the lithium secondary battery is required in spite of the provision of such prevention measures, or a means for restraining the progress of the combustion of the lithium secondary battery is required when the combustion of the lithium secondary battery is initiated.

Generally, a method of mounting an element at the outside of a cell and a method of using a material contained in the cell may be used to prevent the combustion and explosion of a secondary battery due to the overcharge of the secondary battery. The use of a positive temperature coefficient (PTC) element and a current interruption device (CID) element using the change in temperature of the battery, a protection circuit using the change in voltage of the battery, and a safety vent using the change in internal pressure of the battery belongs to the former. The addition of a material that can change physically, chemically, and electrochemically depending upon the change in temperature or voltage of the battery belongs to the latter.

The elements mounted at the outside of the cell use the temperature, voltage, and internal pressure of the battery, with the result that a secure interception is accomplished. However, an installation process and an installation space are additionally required. On the other hand, the CID element is applicable to only a cylindrical battery. In addition, the elements do not effectively perform a protecting function the battery in connection with tests that require quick response time, such as an internal short circuit, a nail penetration, or a local crush.

As a method of using a material contained in the cell, there is a method of adding an additive for improving a safety to an electrolyte or electrodes. For example, a material that causes electrochemical polymerization under a condition, such as the overdischarge, may be added to the electrolyte such that the polymerization product of the material forms a passivation film on the electrodes upon the overdischarge or solidifies the electrolyte to restrain the abnormal operation of the battery. This chemical safety measure does not require an additional process and space, and is applicable to all kinds of batteries. However, the chemical safety measure does not guarantee the reliable operation of the battery. Furthermore, the performance of the battery is lowered due to the addition of the material.

Therefore, there is a high necessity for a technology to easily provide a battery with inflammability without affecting the operation of the battery and requiring a large space.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when a film ("safety film"), including expansible graphite that generates inflammable gas at a high temperature and polyurethane that causes an endothermic reaction and generates char at a high temperature, is mounted in a secondary battery, the safety film can be easily attached the secondary battery without affecting the operating components of the secondary battery, and the secondary battery exhibiting excellent inflammability can be manufactured without deteriorating the efficiency of the secondary battery. The present invention has been completed based on these findings.

DETAILED DESCRIPTION OF PREFERRED EMBODIMENTS

In accordance with the present invention, the above and other objects can be accomplished by the provision of a secondary battery comprising a film ("safety film") including expansible graphite that generates inflammable gas at a high temperature and polyurethane (PU) that causes an endothermic reaction and generates char at a high temperature, the safety film being disposed in the battery.

The safety film according to the present invention is a thin member, and therefore, the present invention has advantages in that it is possible to easily apply the safety film to a specific region of the battery, and the size of a space where the safety film is applied is very small. In addition, the graphite component and the polyurethane component included in the safety film provide effective and perfect inflammability by virtue of the inflammable gas and char generated from the graphite component and the polyurethane component, respectively.

The graphite component and the polyurethane component may be included in the safety film in various manners. For example, (1) the graphite component and the polyurethane component may be added to a substrate film, (2) the graphite component and the polyurethane component may be coated on the surface of the substrate film, or (3) one of the components (for example, the polyurethane component) may be a substrate, and the other component (for example, the graphite component) may be added to or coated on the substrate.

In connection with the first and second film structures, the substrate film is not particularly restricted so long as the substrate film stably supports the expansible graphite and the PU while the substrate film does not cause a chemical reaction in the battery. For example, the substrate film may be made of polyolefin-based polymer, such as polyethylene, polypropylene, and polybutylene, polyurethane, or polyethylene terephthalate.

In a preferred embodiment, the safety film includes 20 to 50% by weight of expansible graphite and 20 to 50% by weight of PU based on the total weight of the film. Although the contents of, the expansible graphite and the PU are suitable for providing appropriate inflammability and manufacturing the film, it is a matter of course that the contents of the expansible graphite and the PU may be changed depending upon whether the expansible graphite and the PU are added to the substrate film or coated on the surface of the substrate film.

In connection with the third film structure, the safety film is preferably manufactured by adding the expansible graphite to the PU as a substrate film. In this case, the safety film preferably includes 20 to 50% by weight of the expansible graphite based on the total weight of the safety film including the PU as the substrate film.

The expansible graphite according to the present invention is a material including acid contained in the layered crystal structure of the graphite. The expansible graphite has a property in that the acid contained between the layers of the graphite is evaporated due to an endothermic reaction at a high temperature of 150° C. or more, whereby the graphite rapidly expands up to 300 to 400% of the initial volume of the graphite. The expansible graphite discharges inflammable gas according to the evaporation of the acid, and the inflammable gas increases limiting oxygen index (LOI) to fundamentally prevent the combustion of the battery. Furthermore, the graphite itself is a conductive material. For this reason, the graphite does not affect the performance and operation of the battery when the graphite is included in the battery. Generally, the acid contained in the layered crystal structure of the graphite may be sulfuric acid, nitric acid, or a mixture thereof. The specification of the expansible graphite and a method of manufacturing the expansible graphite are well known, and therefore, an additional description thereof will not be given.

Generally, a commercialized expansible graphite has a particle diameter of 150 μm. On the other hand, the expansible graphite according to the present invention has a particle diameter of preferably 5 to 40 μm, more preferably 10 to 25 μm. When the particle diameter of the expansible graphite is too large, the thickness of the safety film is increased. When the particle diameter of the expansible graphite is too small, on the other hand, the graphite powder coheres with the result that the graphite is not uniformly distributed.

The PU is a polymer having a urethane structure ($-NHCO_2-$) in a molecular chain thereof. The PU has properties in that the PU causes an endothermic reaction at a temperature of approximately 200° C., and generates char at a temperature of approximately 400° C., thereby restraining an additional oxidation reaction of the battery.

The molecular weight of the PU that can be preferably used in the present invention is 10,000 to 50,000. The specification of the PU and a method of manufacturing the PU are well known.

For example, the PU may be manufactured through the reaction between an isocyanate compound (a) including at least two isocyanate groups and an organic compound (b) including at least two isocyanate functional groups. Alternatively, the PU may be manufactured by polymerizing the above-mentioned compounds (a) and (b) and an organic compound (c) including one or two isocyanate functional groups and at least one hydrophilic ionic group to compose a polyurethane prepolymer (d) in which isocyanate groups are included at opposite ends thereof and the ionic group is included at a mole ratio of 0.1 to 10 per molecule, and of which the number average molecular weight is 1,000 to 30,000, and chain-extending the polyurethane prepolymer (d).

Of course, various kinds of PU that can be manufactured in other different methods may be used in the present invention. Generally, a commercialized PU is provided in a liquid or powder phase. According to the present invention, it is preferable to add PU powder having a particle diameter of 5 to 15 μm so as to easily manufacture the safety film. When the particle diameter of the PU powder is too large, the thickness of the safety film is excessively increased, and the strength of the safety film is greatly decreased. When the particle diameter of the PU powder is too small, on the other hand, the PU powder easily coheres with the result that the PU powder is not uniformly distributed.

The safety film may be simply manufactured. For example, the safety film may be manufactured by extruding polymer for a substrate film, expansible graphite, and PU powder. When the PU is used as the substrate film, the safety film may be manufactured by extruding the expansible graphite and the PU powder. When the PU is manufactured in a liquid phase, the safety film may be manufactured by adding the expansible graphite to the liquid component to form the liquid component into a slurry phase and coating the slurry phase component on the substrate film. In addition, the above-described methods may be partially jointly used to manufacture the safety film in a composite structure in which the expansible graphite and the PU are contained in the substrate film.

The thickness of the safety film is not particularly restricted so long as the safety film does not affect the components of the battery when the safety film is attached inside the battery.

The safety film may be attached inside or outside a case of the battery or to an electrode assembly or a cap assembly of the battery.

When the safety film is directly attached to the electrode assembly, for example, the electrode assembly may be constructed in a structure including bicells or full cells, and the safety film may be interposed between the bicells or the full cells.

In consideration of a fact that the safety-related problem of the battery is mainly caused due to the reaction at the electrodes, for example, the electrolyte decomposition at the electrodes, further improved safety of the secondary battery may be expected by virtue of the above-described structure in which the safety film is included in the electrode assembly.

Hereinafter, examples of the present invention will be described in more detail. It should be noted, however, that the scope of the present invention is not limited by the illustrated examples.

EXAMPLE 1

1-1. Manufacture of Cathode

A cathode mixture slurry was prepared by adding 95% by weight of $LiCoO_2$ as a cathode active material, 2.5% by weight of Super-P (a conducting agent), and 2.5% by weight of PVdf (a coupling agent) to N-methyl-2-pyrrolidone (NMP) as a solvent. The cathode mixture slurry was coated on an aluminum foil, and was then dried and pressed to manufacture a cathode.

1-2. Manufacture of Anode

An anode mixture slurry was prepared by adding 95% by weight of artificial graphite as an anode active material, 2.5% by weight of Super-P (a conducting agent), and 2.5% by weight of PVdf (a coupling agent) to NMP as a solvent. The anode mixture slurry was coated on a copper foil, and was then dried and pressed to manufacture an anode.

1-3. Manufacture of Safety Film

30% by weight of expansible graphite having a particle diameter of 20 μm and 40% by weight of polyurethane (PU) powder having a particle diameter of 10 μm were mixed into a polypropylene pallet as a component for a substrate film. The mixture was extruded to manufacture a safety film having a thickness of 100 μm.

1-4. Assembly of Battery

Cell Guard™ was used as a separator. The cathode, manufactured as described in Paragraph 1-1, and the anode, manufactured as described in Paragraph 1-2, and the separator were sequentially stacked to manufacture a bicell. In this way, a plurality of bicells were manufactured. The safety film, manufactured as described in Paragraph 1-3, was interposed between some of the bicells. Finally, the bicells were mounted in a battery case to manufacture a secondary battery.

EXAMPLE 2

A secondary battery was manufactured in the same manner as Example 1 except that 30% by weight of expansible graphite having a particle diameter of 20 μm was mixed into PU as a substrate film, and the mixture was extruded to manufacture a safety film.

COMPARATIVE EXAMPLE 1

A secondary battery was manufactured in the same manner as Example 1 except that a safety film was not used.

EXPERIMENTAL EXAMPLE 1

Overcharge experiments were carried out with respect to the secondary batteries manufactured according to Example 1, Example 2, and Comparative example 1 under the conditions specified in Table 1 below.

TABLE 1

| Charge current | Example 1 | Example 2 | Comparative example 1 |
|---|---|---|---|
| 1C rate | vent | vent | explosion |
| 5C rate | vent | vent | explosion |

As can be seen from Table 2 above, the experiment results revealed that, for the secondary batteries manufactured according to Example 1 and Example 2, the sealed regions of the battery cases of the secondary batteries were separated from each other due to inflammable gas generated from the expansible graphite under the respective overcharge conditions, whereby gas was discharged from the secondary batteries, and char was generated from the polyurethane, whereby an endothermic reaction was caused, and therefore, the safety of the secondary batteries was secured. On the other hand, the experiment results revealed that the secondary batteries manufactured according to Comparative example 1 caught fire and exploded.

EFFECT OF THE INVENTION

As apparent from the above description, the secondary battery according to the present invention has effects in that the safety film can be easily attached to a region of the secondary battery where the operating components of the secondary battery are not affected, and the secondary battery exhibiting excellent inflammability is manufactured without deteriorating the efficiency of the secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery comprising a safety film including expansible graphite that generates inflammable gas at a high temperature and polyurethane (PU) that causes an endothermic reaction and generates char at a high temperature, the safety film being disposed in the battery,
   wherein the safety film includes 20 to 50% by weight of expansible graphite and 20 to 50% by weight of PU, and the expansible graphite has a particle diameter of 5 to 40 μm.

2. The secondary battery according to claim 1, wherein the safety film is manufactured by coating expansible graphite and PU on the surface of a substrate film.

3. The secondary battery according to claim 1, wherein the safety film is manufactured by adding expansible graphite to PU as a substrate film.

4. The secondary battery according to claim 3, wherein the safety film includes 20 to 40% by weight of expansible graphite based on the total weight of the safety film.

5. The secondary battery according to claim 1, wherein the safety film is attached inside or outside a case of the battery or to an electrode assembly or a cap assembly of the battery.

6. The secondary battery according to claim 4, wherein the battery comprises an electrode assembly including a plurality of bicells or full cells, and the safety film is interposed between the bicells or the full cells.

* * * * *